United States Patent
Lee et al.

(10) Patent No.: US 10,374,958 B2
(45) Date of Patent: Aug. 6, 2019

(54) METHOD AND APPARATUS FOR TCP-BASED TRANSMISSION CONTROL IN COMMUNICATION SYSTEM

(71) Applicants: Samsung Electronics Co., Ltd., Suwon-si, Gyeonggi-do (KR); ULSAN NATIONAL INSTITUTE OF SCIENCE AND TECHNOLOGY, Ulsan (KR)

(72) Inventors: Jin-Sung Lee, Seoul (KR); Kyunghan Lee, Ulsan (KR); Jung-Shin Park, Seoul (KR); Han-Na Lim, Seongnam-si (KR); Joo-Hyung Lee, Bucheon-si (KR); Hyung-Ho Lee, Seoul (KR)

(73) Assignees: Samsung Electronics Co., Ltd., Suwon-si (KR); Ulsan National Institute of Science and Technology, Ulsan (KR)

( * ) Notice: Subject to any disclaimer, the term of this patent is extended or adjusted under 35 U.S.C. 154(b) by 0 days.

(21) Appl. No.: 15/735,012

(22) PCT Filed: Jun. 8, 2016

(86) PCT No.: PCT/KR2016/006078
§ 371 (c)(1),
(2) Date: Dec. 8, 2017

(87) PCT Pub. No.: WO2016/200154
PCT Pub. Date: Dec. 15, 2016

(65) Prior Publication Data
US 2018/0159778 A1   Jun. 7, 2018

(30) Foreign Application Priority Data

Jun. 8, 2015   (KR) .................. 10-2015-0080840

(51) Int. Cl.
*H04L 12/801* (2013.01)
*H04L 12/807* (2013.01)
(Continued)

(52) U.S. Cl.
CPC ............ *H04L 47/193* (2013.01); *H04L 47/11* (2013.01); *H04L 47/225* (2013.01); *H04L 47/27* (2013.01); *H04L 47/283* (2013.01); *H04L 47/37* (2013.01)

(58) Field of Classification Search
CPC ..... H04L 47/193; H04L 47/11; H04L 47/225; H04L 47/27; H04L 47/283; H04L 47/37
(Continued)

(56) References Cited

U.S. PATENT DOCUMENTS 6,643,259 B1   11/2003 Borella et al.
8,639,835 B2   1/2014 Kotecha et al.
(Continued)

FOREIGN PATENT DOCUMENTS

KR   10-2014-0143355 A   12/2014

*Primary Examiner* — Christopher R Crompton

(57) ABSTRACT

The present disclosure relates to a 5G or pre-5G communication system for supporting a higher data rate beyond a 4G communication system such as LTE. In addition, the present disclosure relates to a TCP-based transmission control method and apparatus which can reduce a delay time while improving a transmission rate in a communication system. A method for TCP-based transmission control in a communication system according to an embodiment of the present disclosure comprises the steps of: determining a maximum target transmission rate for TCP control using maximum congestion windows (CWNDs) estimated at predetermined times; determining a minimum target round trip time (RTT) for the TCP control using minimum RTTs estimated at the predetermined times; and updating at least one of a congestion window (CWND) and a receive window (RWND) in an (Continued)

RTT time slot, using the maximum target transmission rate and the minimum target RTT.

22 Claims, 13 Drawing Sheets

(51) Int. Cl.
*H04L 12/815* (2013.01)
*H04L 12/841* (2013.01)

(58) Field of Classification Search
USPC .......................................................... 370/230
See application file for complete search history.

(56) References Cited

U.S. PATENT DOCUMENTS

| | | | |
|---|---|---|---|
| 2005/0165948 A1* | 7/2005 | Hatime .................... | H04L 47/10 |
| | | | 709/235 |
| 2006/0034286 A1 | 2/2006 | Koning et al. | |
| 2008/0043621 A1* | 2/2008 | Hatime .................... | H04L 47/10 |
| | | | 370/234 |
| 2011/0013516 A1 | 1/2011 | Black et al. | |
| 2014/0241163 A1 | 8/2014 | Lee et al. | |
| 2014/0281018 A1 | 9/2014 | Waclawsky et al. | |
| 2015/0043339 A1 | 2/2015 | Wang et al. | |
| 2016/0255005 A1* | 9/2016 | Ramaiah ................ | H04L 47/12 |
| | | | 370/231 |
| 2017/0366650 A1* | 12/2017 | Zhu ......................... | H04L 47/27 |

\* cited by examiner

METHOD AND APPARATUS FOR TCP-BASED TRANSMISSION CONTROL IN COMMUNICATION SYSTEM

CROSS-REFERENCE TO RELATED APPLICATIONS AND CLAIM OF PRIORITY

The present application claims priority under 35 U.S.C. § 365 and is a 371 National Stage of International Application No. PCT/KR2016/006078 filed Jun. 8, 2016, which claims the benefit of Korean Patent Application No. 10-2015-0080840 filed Jun. 8, 2015, the disclosures of which are fully incorporated herein by reference into the present disclosure as if fully set forth herein.

TECHNICAL FIELD

The present disclosure relates to a method and apparatus for transmission control protocol (TCP)-based transmission control in a communication system, and more particularly, to a method and apparatus for performing TCP-based transmission control in consideration of both a transmission rate and a delay.

BACKGROUND

To satisfy the increasing demands for wireless data traffic since commercialization of $4^{th}$ generation (4G) communication systems, efforts have been made to develop an improved $5^{th}$ generation (5G) communication system or a pre-5G communication system. For this reason, the 5G or pre-5G communication system is referred to as a beyond-4G or post long term evolution (LTE) system.

To achieve high data rates, deployment of the 5G communication system in a millimeter wave (mmWave) band (for example, a 60-GHz band) is under consideration. For the 5G system, beamforming, massive multiple input multiple output (MIMO), full dimensional MIMO (FD-MIMO), array antenna, analog beamforming, and large-scale antenna techniques have been discussed in order to mitigate the path loss and propagation distance of waves.

Further, for network improvement in a system, technologies such as advanced small cell, cloud radio access network (RAN), ultra-dense network, device-to-device (D2D) communication, wireless backhaul, moving network, cooperative communication, coordinated multi-point (CoMP), and interference cancellation have been developed in the 5G system.

Besides, advanced coding modulation (ACM) techniques such as hybrid FSK and QAM modulation (FQAM) and sliding window superposition coding (SWSC), and advanced access techniques such as filter bank multi carrier (FBMC), non-orthogonal multiple access (NOMA), and sparse code multiple access (SCMA) have been developed in the 5G system.

In a communication system, a TCP algorithm for stable transmission control is performed in the transport layer of the open systems interconnection reference model (OSI) or TCP/Internet protocol (IP) layer classifications. The roles of the transport layer in TCP are divided into flow control and congestion control.

The flow control is intended to control the amount of data to be transmitted over a network according to the state and performance of a receiver by a transmitter in a multi-hop network including the Internet. The congestion control is intended to reduce a packet loss caused by a network load according to the states and performances of links in a network. The congestion control functions to ensure fairness between a plurality of network flows sharing a network.

Conventional TCP algorithms include, for example, TCP Tahoe, TCP Reno, TCP New Reno, TCP Vegas, high-speed TCP, FAST TCP, TCP Westwood, TCP FIT, Compound TCP, TCP BIC, and TCP CUBIC. The top-priority aim of designing a TCP algorithm is to fast detect the available bandwidth of a given network and maximize the utilization of the available bandwidth (that is, maximize a transmission rate).

For this purpose, most of TCP algorithms fast detect a maximum available bandwidth (that is, a maximum transmission rate) by aggressively increasing the amount of packet data transmitted to a network, simultaneously with starting transmission control. The increased aggressiveness of packet transmission may lead to fast detection of an available bandwidth, but impairs fairness with other TCP flows. Accordingly, to overcome the fairness problem, for example, TCP CUBIC used as a default TCP in Linux and so on including Android-based operating systems (OSs) for terminals is designed to have high aggressiveness but allow temporary switching to low aggressiveness so as to ensure fairness with other TCP flows, simultaneously with fast detection of an available bandwidth.

One thing to note with fast detection of an available bandwidth in the conventional TCP algorithms is that the available bandwidth of a network is not managed directly and recorded. Because entry and termination of a plurality of TCP flows occur frequently in the available bandwidth of the network, the available bandwidth of the network may not be maintained to be constant and thus may not be represented as a specific constant value. Therefore, a determination as to whether the available bandwidth has been reached may be replaced with a determination as to whether the network is 'congested' in the process of increasing the amount of packet data transmitted (introduced) to the network according to an algorithm. The basis of the replacement lies in that the meaning of congestion that 'introduction of more packets decreases the total network performance' is substantially identical to the meaning of an available bandwidth being 'a maximum value for an appropriate amount of packet data that can be introduced'.

TCP algorithms determine congestion largely by loss-based TCP and delay-based TCP. However, almost all of the TCP algorithms rely on loss-based TCP, for congestion determination. In loss-based TCP, it is determined based on packet drop that a network is congested, whereas in delay-based TCP, it is determined that a network is congested, based on an increment from an initial delay time (for example, a base round trip time (RTT)).

Despite their advantage of accurate detection of a maximum value for an available bandwidth, the loss-based TCP algorithms occupying the most proportion of the conventional TCP algorithms continuously cause packet loss for the accurate detection of the maximum value. If the cause of the packet loss is a radio channel, they have fundamental limitations leading to failure in detecting an accurate bandwidth. However, if a radio channel fails in transmitting a packet in a beyond 3G mobile communication network, the media access control (MAC) layer recovers the packet, and the packet loss on the radio channel may be hidden by a method for adaptively setting a modulation and coding scheme (MCS) level according to a channel or the like, so that a transmitter and a receiver may not perceive the packet loss. Therefore, activation of loss-based TCP in an up-to-date wireless environment may not bring about great performance degradation in terms of transmission rate.

On the other hand, the delay-based TCP algorithms are advantageous in that packet loss can be prevented and a delay can be maintained at an appropriate level since congestion can be controlled based on a delay increase before direct packet loss occurs in a network. However, they have a difficulty in dynamically detecting a maximum value for an available bandwidth due to conservative bandwidth detection relative to the loss-based TCP algorithms, or may suffer from a severe problem of losing the available bandwidth detection function if an initial time delay based on which the TCP algorithms are operated is not valid due to a rapid change in the state of the network.

Specifically, among the loss-based TCP algorithms, for example, TCP New Reno standardized as request for comments (RFC) 6582 and widely used, and TCP CUBIC used as a default TCP algorithm for Linux update a congestion window (CWND) by which the amount of packet data transmitted (introduced) to a network is determined by the following [Equation 1].

$$\text{TCP New Reno:} CWND(i)=2*CWND(i-1) \quad CWND(i-1)<SSThreshold$$

$$CWND(i)=CWND(i-1)+1 \quad CWND(i-1) \geq SSThreshold$$

$$\text{TCP CUBIC:} CWND(i)=C(t-K)^3+W\_max \quad \text{Equation 1}$$

In [Equation 1], CWND represents a congestion window, i represents an RTT time slot, SSThreshold represents a threshold based on which an increase rate of CWND is determined, and W_max represents the size of a window shortly before a packet loss occurs.

FIG. 1 illustrates an exemplary operation of a congestion window in TCP New Reno.

Referring to FIG. 1, the congestion window, CWND of TCP New Reno is doubled each time during a time period at a slow start threshold (SSThreshold), and is increased by 1 each time during a time period at or above SSThreshold. If packet losses 101 and 103 occur, SSThreshold is set to CWND(i)/2, and after CWND decreases so that CWND(i+1)=SSThreshold 111, CWND increases again. Upon occurrence of a retransmission timeout (RTO) due to non-recovery of a lost packet during a predetermined time period as in the example illustrated in FIG. 1, SSThreshold is set to CWND(i)/2 as indicated by reference numeral 113, CWND (i+1) is reset to 1, and then CWND increases again.

FIG. 2 illustrates an exemplary operation of a congestion window in TCP CUBIC.

Referring to FIG. 2, the congestion window CWND of TCP CUBIC is characterized by an increase in the form of a cubic function for time t which is a time after previous packet losses 201 and 203 occur (a time after the starting time of a flow in an initial state in which a previous packet time is not determined). Upon occurrence of a packet loss, $W\_max=\beta*CWND(i-1)$, and $K=(\beta*W\_max/C)^{1/3}$, as indicated by reference numerals 213 and 223. Herein, C is a constant and may be tuned to values near to 0.8 and 0.4, respectively.

Among the delay-based TCP algorithms, FAST TCP used in the field of content delivery network (CDN) updates a congestion window by [Equation 2] below.

$$CWND(i)=(1-\gamma)*CWND(i-1)+\gamma*(CWND(i-1)*(baseRTT/RTT(i))+\alpha) \quad \text{Equation 2}$$

[Equation 2] will be described. The congestion window update of FAST TCP is determined to be a median value between the constants $\gamma(\epsilon(0, 1))$ of a new congestion window determined by a combination of a ratio of a current observed time delay to an initial time delay and a constant, and a previous congestion window. The constant $\gamma(\epsilon(0, 1))$ is a weighted moving average for use in determining a ratio between a previous value and a current value, which is reflected in calculation of an average value. The constant represents the number of packets to be stored always in a network buffer according to FAST TCP. Like TCP New Reno, the congestion window of FAST TCP increases or decreases according to a combination of a constant-based linear increase component and an RTT increase-based proportional decrease component.

FIG. 3 illustrates an exemplary operation of a congestion window in FAST TCP. The congestion window of FAST TCP may converge into a point at which its increase and decrease components are balanced (CWMD convergence). In general, $\alpha$ and $\gamma$ are set to values near to 200 and 0.5, respectively.

The above-described conventional TCP algorithms focus on throughput maximization within an available bandwidth. Therefore, the conventional TCP algorithms have high maximum transmission rates on the whole, and differ mostly in time taken to achieve a maximum transmission rate, a scheme of increasing a congestion window to increase a transmission rate, a congestion avoidance scheme in the case where congestion is sensed due to packet loss, and a transmission rate loss in the case where packet loss continuously occurs.

As TCP algorithms have been designed in a transmission rate-oriented manner for a long time as described above, another important performance index, delay performance has not been considered directly in the conventional TCP algorithms. Therefore, there is a need for an improved TCP algorithm for consistently ensuring both a high transmission rate and a short time delay which are essential to realization of future-generation high valued network services such as remote operation, haptic control, and realistic communication.

SUMMARY

An aspect of the present disclosure is to provide a method and apparatus for TCP-based transmission control, which can increase a transmission rate and decrease a time delay in a communication system.

Another aspect of the present disclosure is to provide a method and apparatus for TCP-based transmission control, which can ensure a maximum transmission rate and a minimum time delay in a communication system.

Another aspect of the present disclosure is to provide a method and apparatus for TCP-based transmission control, which can adaptively control a transmission rate and a time delay in a communication system.

In an aspect of the present disclosure, a method for performing transmission control protocol (TCP)-based transmission control in a communication system includes determining a target maximum transmission rate for TCP control, using a maximum congestion window (CWND) estimated every predetermined time, determining a target minimum round trip time (RTT) for TCP control, using a minimum RTT estimated every predetermined time, and updating at least one of the congestion window (CWND) and a reception window (RWND) in an RTT time slot, using the target maximum transmission rate and the target minimum RTT.

In another aspect of the present disclosure, an apparatus for performing TCP-based transmission control in a communication system includes a transceiver for transmitting and receiving data through a network, and a controller for determining a target maximum transmission rate for TCP control, using a maximum congestion window (CWND) estimated every predetermined time, determining a target minimum RTT for TCP control, using a minimum RTT estimated every predetermined time, and updating at least one of the congestion window (CWND) and a reception window (RWND) in an RTT time slot, using the target maximum transmission rate and the target minimum RTT.

DETAILED DESCRIPTION

In the following description of embodiments of the present disclosure, a detailed description of a known function or structure will not be provided lest it should obscure the subject matter of the present disclosure.

An embodiment of the present disclosure proposes a TCP-based transmission control method that ensures a high transmission rate and a low time delay in a communication system.

To help understanding of the present disclosure, a time delay in a conventional TCP algorithm will be described in detail.

For example, a TCP CUBIC algorithm has high, inconsistent delay performance, when it is performed in a mobile communication network. It is fundamentally impossible to simultaneously ensure a high transmission rate and a low time delay with the TCP CUBIC algorithm. Specifically, it is known that although the maximum transmission rate of TCP CUBIC is very close to an available bandwidth, the time delay of TCP CUBIC reaches hundreds of ms to tens of seconds, for example, in a $3^{rd}$ generation partnership project (3GPP) high speed packet data access plus (HSPA+) mobile communication network, and 150 to 300 ms in a long term evolution (LTE) mobile communication network.

Figure 1:
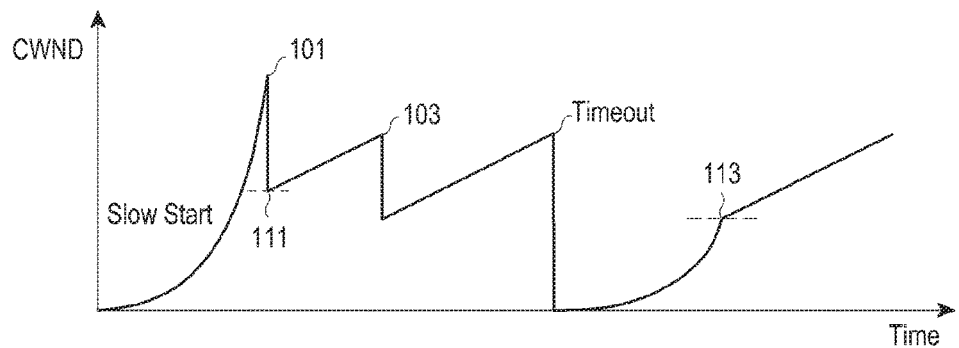
FIG. 1 illustrates an exemplary operation of a congestion window in transmission control protocol (TCP) New Reno.
Figure 2:
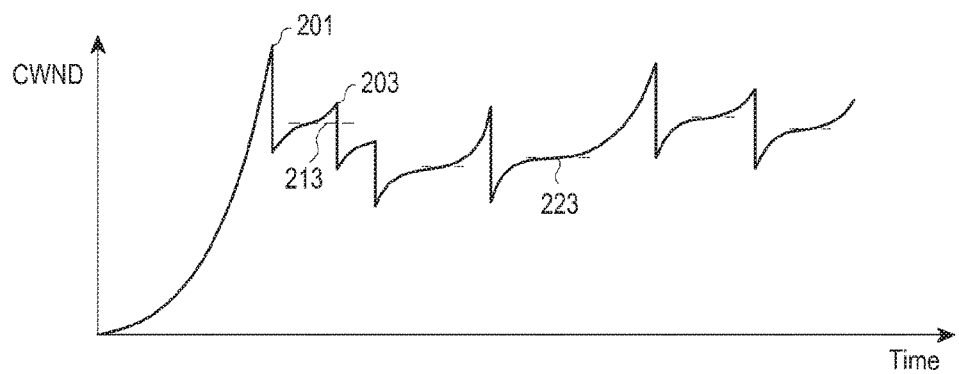
FIG. 2 illustrates an exemplary operation of a congestion window in TCP CUBIC.
Figure 3:
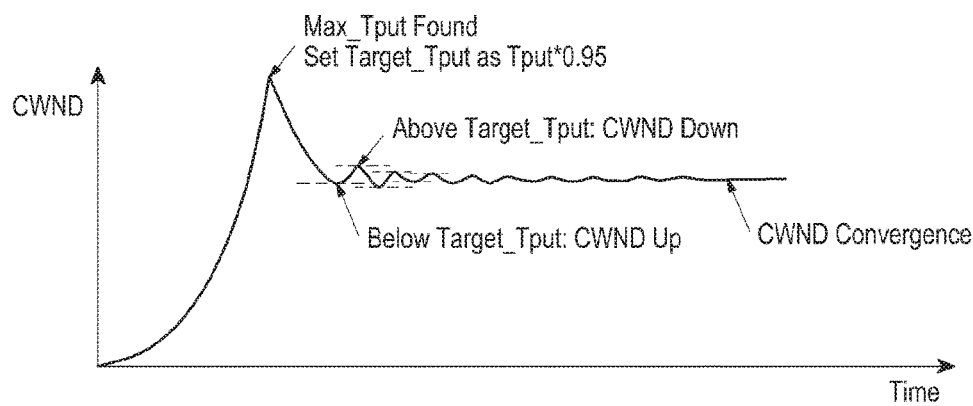
FIG. 3 illustrates an exemplary operation of a congestion window in FAST TCP.
Figure 4A:
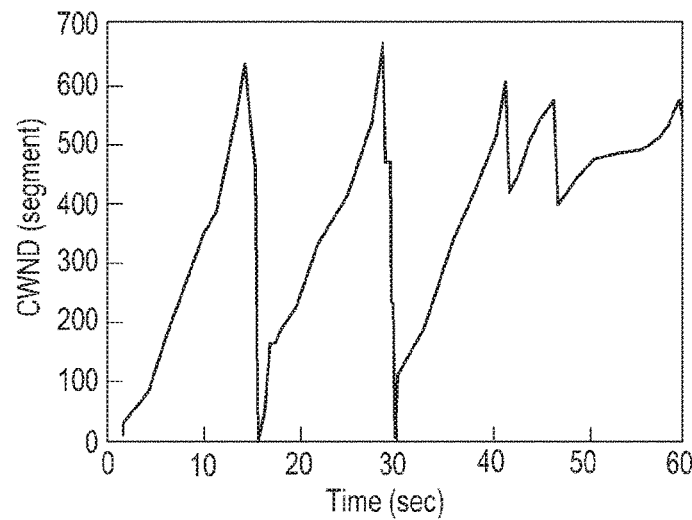
FIGS. 4A and 4B are views illustrating an exemplary congestion window (CWND) and round trip times (RTTs) of TCP CUBIC, as measured in an HSPA+ mobile communication network, respectively.
Figure 4B:
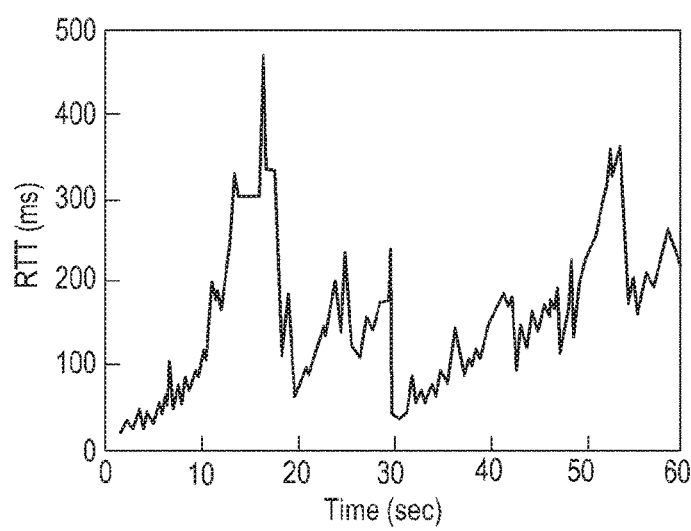

FIGS. 4A and 4B illustrate exemplary congestion window (CWND) and round trip time (RTT) of TCP CUBIC, as measured in an HSPA+ mobile communication network.

The time delay of loss-based TCP such as TCP CUBIC is closely related to the length of a queue in a network path. A latency caused by queuing resulting from packets being filled up in the queue is estimated by dividing the length of the queue in bits by a bottleneck transmission rate (that is, a bottleneck bandwidth), and a final RTT is calculated by adding this latency value to a minimum latency experienced in a network (propagation latency+processing latency). If a 2-MB queue exists in the network path, and a 50-Mbps bottleneck bandwidth is given, an additional time delay of 0.32 seconds, that is, 320 ms occurs. Mobile communication networks including 3G and 4G ones have been designed to have a large queue, and it is expected that a future-generation communication network, 5G is also designed to have a large queue. Accordingly, loss-based TCP may not avoid an additional queuing latency as long as tens to hundreds of ms in addition to a minimum latency.

Figure 5A:
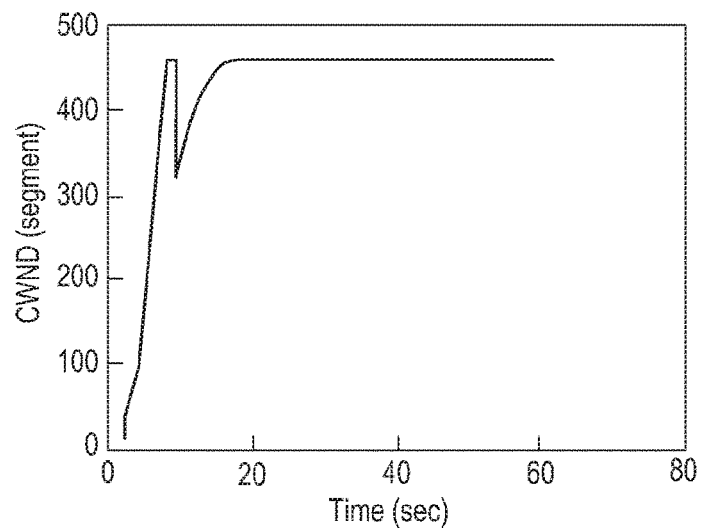
FIGS. 5A and 5B are views illustrating an exemplary congestion window (CWND) and RTTs of TCP CUBIC, as measured in an LTE mobile communication network, respectively.
Figure 5B:
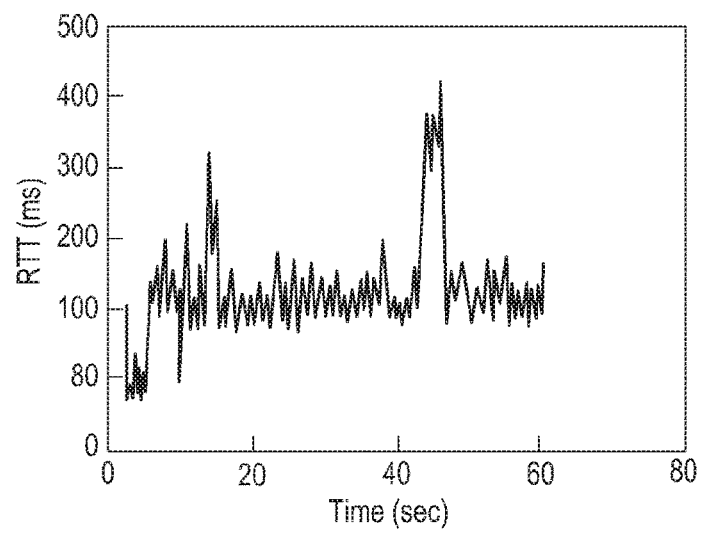

FIGS. 5A and 5B respectively illustrate an exemplary congestion window and latency (RTT) in TCP CUBIC, as measured in an LTE communication network. In FIG. 5a, a CWND operation of TCP CUBIC shows the effects of a receive window (RWND) cropping technology for a smart terminal, which is being applied in a Linux kernel to forcedly reduce the above-described queuing latency. The RWND cropping utilizes the feature of TCP that a flow control is finally performed by AWND (advertised window) =min(CWND, RWND) in order to prevent the CWND to increase until the queue is filled up. AWND represents the size of a transmission window corresponding to the number of segments transmittable without an ACK, and RWND represents the size of a reception window indicating the available buffer capacity of a receiver. As a receiver transmits an RWND (for example, a "tcp_rmem_max" constant) preset according to a network characteristic to a transmitter, the transmitter may not transmit a CWND equal to or larger than the RWND, thereby appropriately reducing the RTT as illustrated in FIG. 5b. However, this ad-hoc solution causes other problems such as the following 1), and 2).

1) If the preset RWND (tcp_rmem_max) is too large or too small for a current network situation, an excessive RTT may occur, or a maximum available bandwidth may not be utilized. If the preset RWND (tcp_rmem_max) is too large or too small, a channel state is extremely poor, which may be observed frequently during overseas roaming.

Figure 6A:
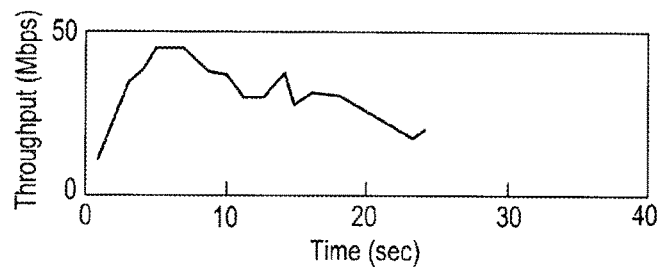
FIGS. 6A and 6B are views illustrating exemplary throughputs taken by two respective TCP CUBIC flows, when the two TCP CUBIC flows share a downlink in one user equipment (UE) in a long term evolution (LTE) mobile communication network.
Figure 6B:
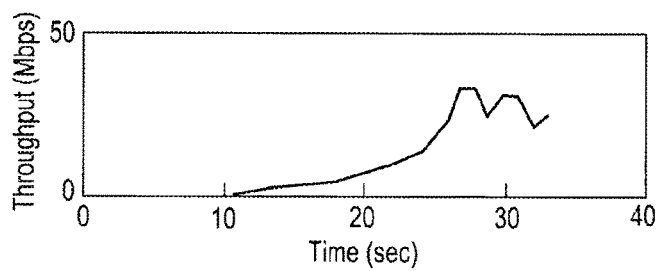

2) When the receiver uses multiple TCP flows, fairness between the multiple TCP flows is a significant issue. In the case of TCP CUBIC, it is known that fairness is ensured. However, loss-based TCP such as TCP CUBIC is designed to ensure fairness only when "loss" occurs. Therefore, if little loss occurs despite use of RWND cropping as illustrated in FIG. 5a, fairness is not ensured at all between TCP flows. FIGS. 6a and 6b respectively illustrate an exemplary throughput taken by each flow, when two TCP CUBIC flows share a downlink in one UE (receiver) in an LTE mobile communication network. In the illustrated case of FIGS. 6a and 6b, two flows are generated every 10 seconds on a downlink in an LTE mobile communication network.

FAST TCP is a TCP algorithm that performs best in terms of simultaneously ensuring a high transmission rate and a low latency among the conventional TCP algorithms. Since FAST TCP is designed to control a congestion window by comparing a latency increment with an initial RTT, it may ensure a latency which is not much outside the initial RTT, and may ensure an appropriate transmission rate through trade-off between a transmission rate and latency performance by controlling the constant α in [Equation 2]. However, FAST TCP is not appropriate to be used in a wireless communication system such as the future-generation 5G mobile communication network in view of the problems described below in a) and b).

a) In [Equation 2], the constant α represents the number of packets to be stored all the time in a queue according to FAST TCP by the network. Accordingly, when a plurality of TCP flows are introduced to the network, the values of α are accumulated and linearly increase the total number of packets existing in the queue, thereby making it impossible to ensure a low latency.

b) When a plurality of TCP flows are introduced, an initial RTT based on which FAST TCP operates becomes larger for later introduced TCP flows. Even though existing TCL flows are terminated, the initial RTT is maintained high and thus there is no way to recover a low latency that can be achieved when only TCP flows of a UE or only a small number of TCP flows exist (in this case, due to the difference between initial RTT estimates, fairness cannot be ensured between an initially introduced TCP flow and a TCP flow introduced in a latter part).

c) The most importable problem is that there is no method for updating an initial RTT in a situation where a receiver (UE) is moving. For example, even though the UE moves to a place in a poor channel state and thus the initial RTT should be increased, there is no method for updating the initial RTT in FAST TCP. If the initial RTT cannot be updated, the initial RTT may be inappropriately increased or an available bandwidth may not be fully utilized.

Meanwhile, another TCP algorithm, Bidirectional TCP directly searches for a maximum bandwidth Tput_max and updates a congestion window by a PI control equation of the following [Equation 3], thereby ensuring performance of about 95% or higher of the maximum bandwidth. PI control described in [Equation 3] refers to proportional-integral control. The PI control is a representative control technique with a proportional term for performing control proportional to the magnitude of an error in a current state and an integral term for performing integral control to eliminate an error in a steady state. If a transmission rate below the maximum bandwidth of a given link is aimed according to the queuing theory, a queue size accumulated in a link may be maintained to be remarkably small, compared to an operation in the maximum bandwidth. This implies that the RTT of Bidirectional TCP may be close to a minimum RTT of a corresponding link.

$$CWND(i)=CWND(i-1)+G*(E(i)+intE(i)), (E(i)+intE(i))\leq 0$$

$$E(i)=1-Tput\_current/(0.95*Tput\_max) \text{(Proportional control)}$$

$$intE(i)=(1-\lambda)*intE(i-1)+\lambda*E(i) \text{(Integral control)} \quad \text{Equation 3}$$

In [Equation 3], Tput_max represents a maximum available bandwidth, and G is a congestion window control constant set to, for example, 50 or a value near to 50. In congestion window control, an increase rate is different from a decrease rate in order to stably ensure a maximum transmission rate. E(i) represents proportional (P) control for transmission rate excess and shortage rates calculated based on the difference between a current transmission rate and a transmission rate threshold, and intE(i) represents integral (I) control for accumulates values of the transmission rate excess and shortage rates calculated based on the difference between the current transmission rate and the transmission rate threshold. λ is a weight constant in a moving average to substitute for an integral equation which is difficult to calculate in a kernel. λ is set to, for example, a value near to ⅛.

Although Bidirectional TCP readily achieves a high transmission rate and a short time delay, it repeats an operation of increasing and decreasing CWND in order to search for a maximum available bandwidth Tput_max suitable for a new channel environment in a situation where a UE is moving. For example, while Bidirectional TCP offers stable TCP performance for almost stationary devices requiring light-weight TCP, like Internet of things (IoT) devices, Bidirectional TCP may not prevent a temporary increase in an RTT, caused by the operation of searching for the maximum available bandwidth Tput_max in a situation in which a UE such as a smartphone with relatively high mobility is moving.

Accordingly, a TCP algorithm should ensure control flow and fairness even in a network environment which continuously changes due to UEs' mobility.

Figure 7:
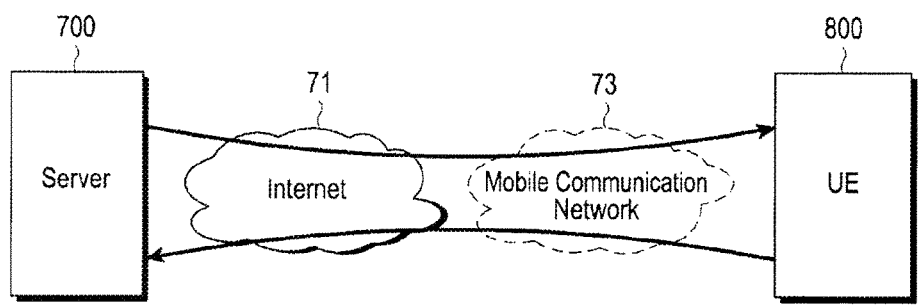
FIG. 7 is a view illustrating a communication system for performing TCP-based transmission control, which can decrease a time delay, while increasing a transmission rate according to an embodiment of the present disclosure.
Figure 8:
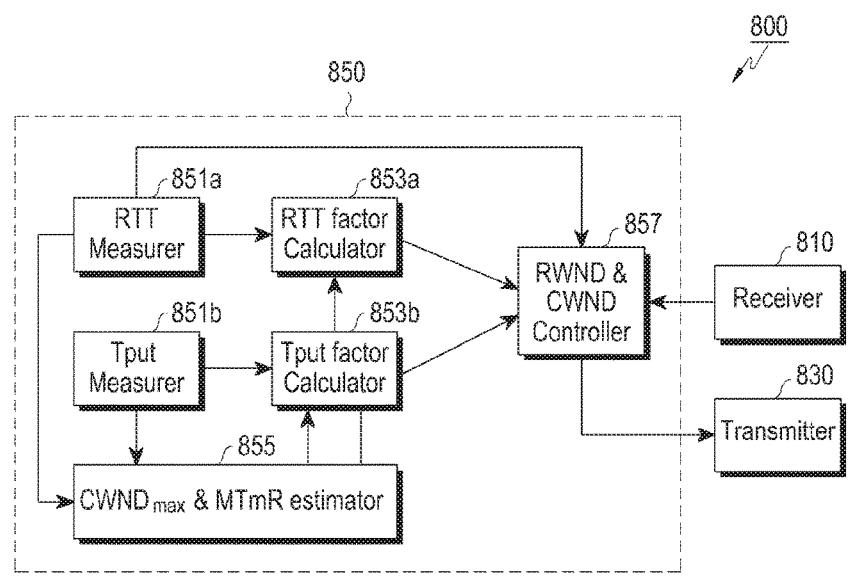
FIG. 8 is a view illustrating an exemplary configuration of a UE according to an embodiment of the present disclosure.
Figure 9A:
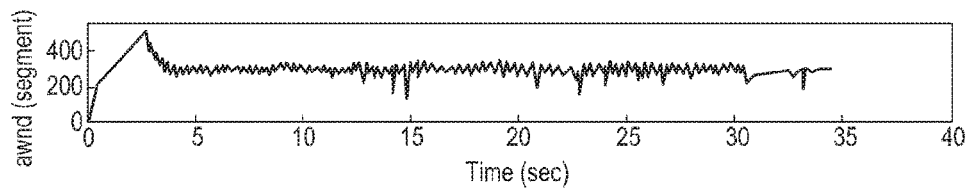
FIGS. 9A-9G are views illustrating test results of a proposed TCP algorithm between a terminal at a fixed position and a server in a communication system according to an embodiment of the present disclosure.
Figure 9B:
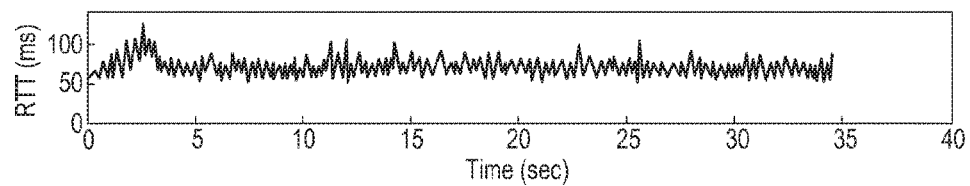
Figure 9C:
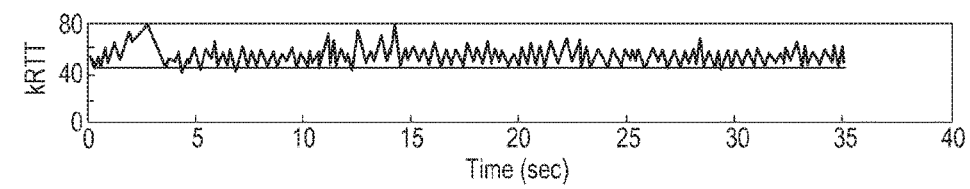
Figure 9D:
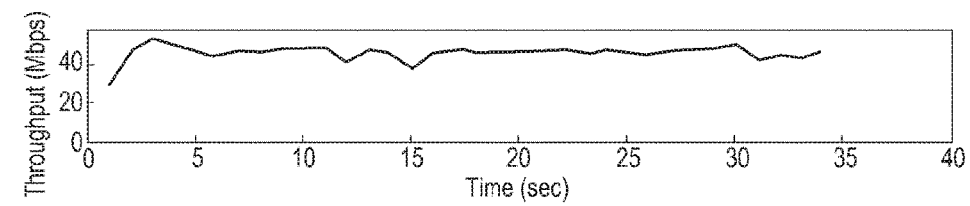
Figure 9E:
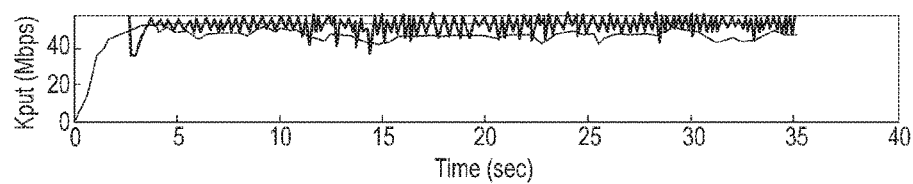
Figure 9F:
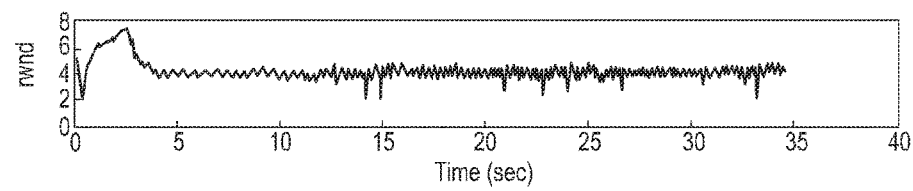
Figure 9G:
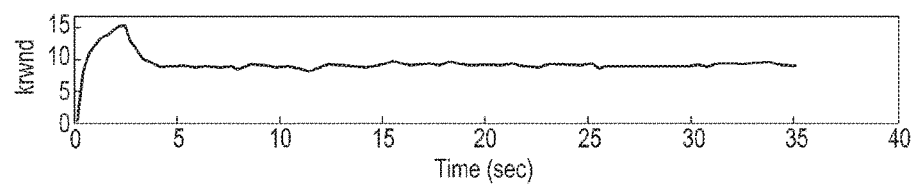
Figure 10A:
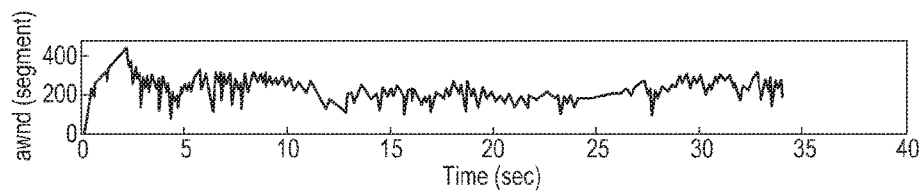
FIGS. 10A-10G are views illustrating test results of a proposed TCP algorithm between a mobile terminal and a server in a communication system according to an embodiment of the present disclosure.
Figure 10B:
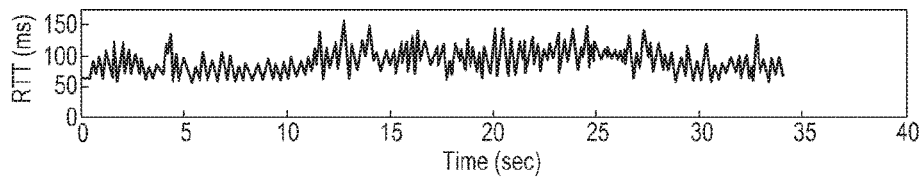
Figure 10C:
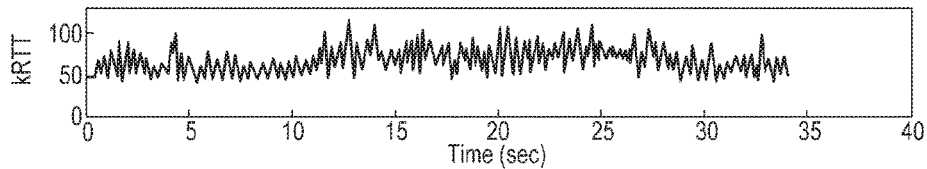
Figure 10D:
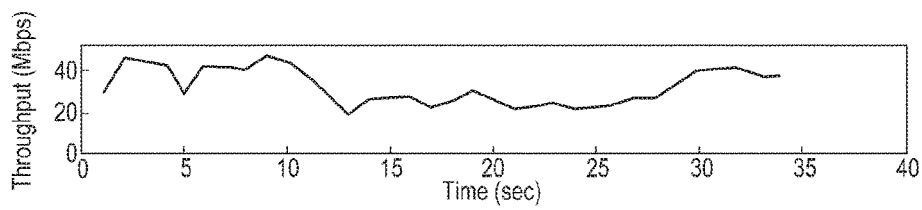
Figure 10E:
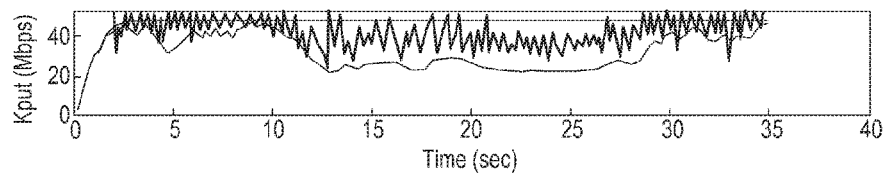
Figure 10F:
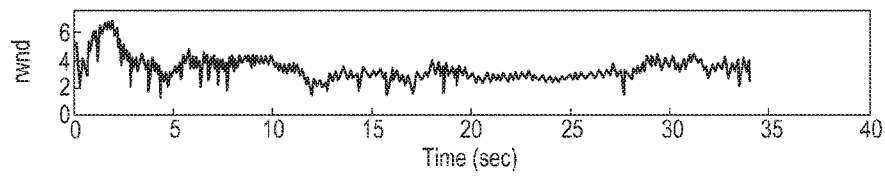
Figure 10G:
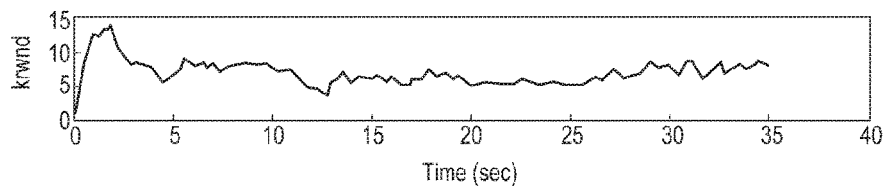
Figure 11A:
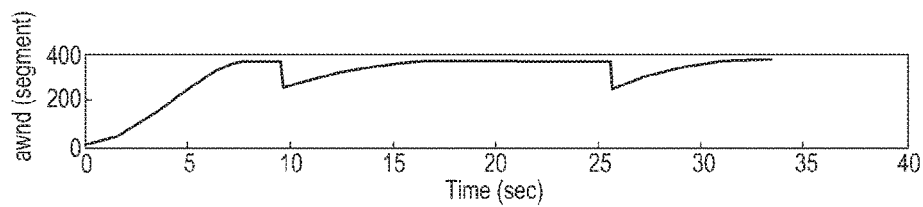
FIGS. 11A-11G are views illustrating TCP performance in the case where the proposed TCP algorithm and a conventional TCP algorithm are applied simultaneously under the same conditions as in the test of FIGS. 9A-9G.
Figure 11B:
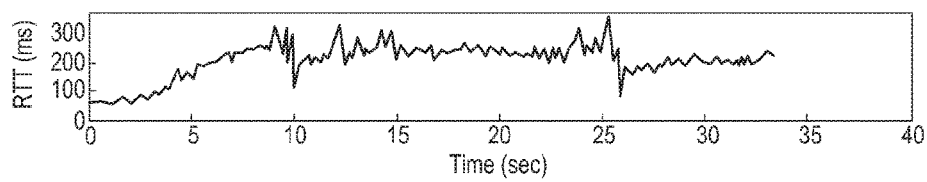
Figure 11C:
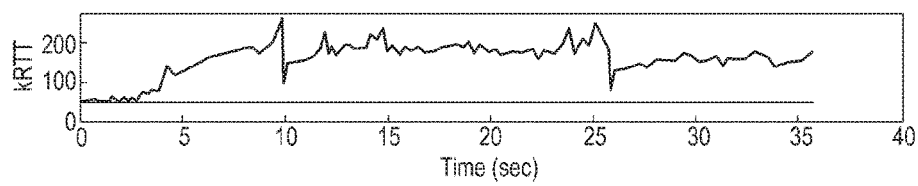
Figure 11D:
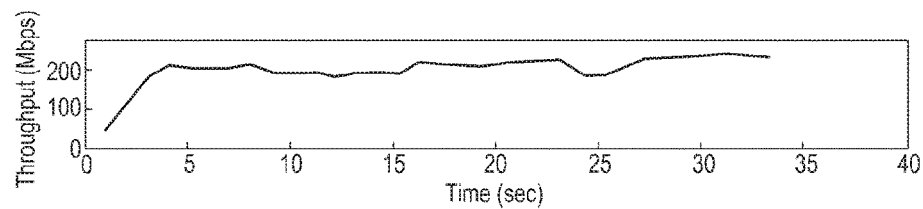
Figure 11E:
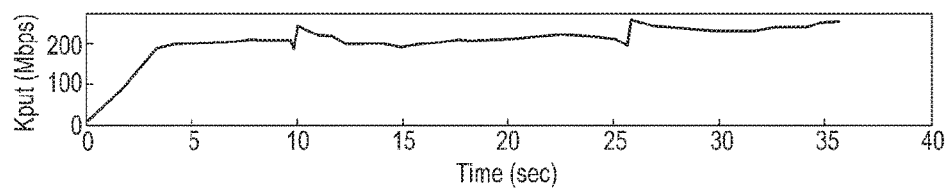
Figure 11F:
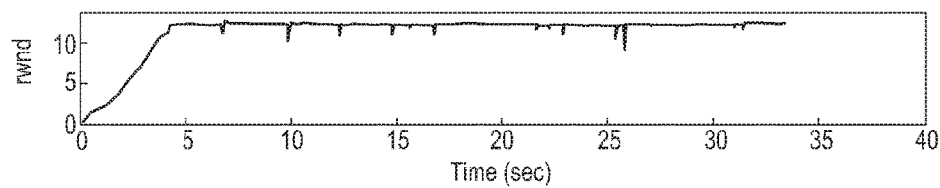
Figure 11G:
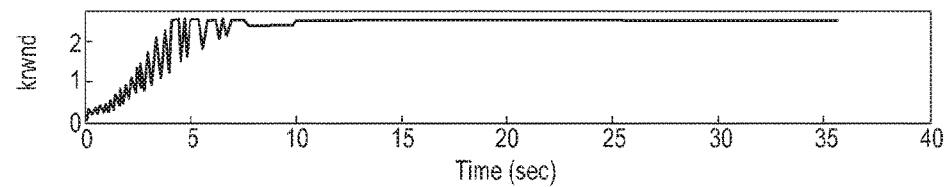
Figure 12A:
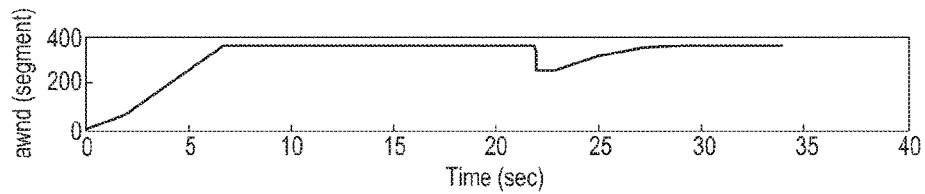
FIGS. 12A-12G are views illustrating TCP performance in the case where the proposed TCP algorithm and a conventional TCP algorithm are applied simultaneously under the same conditions as in the test of FIGS. 10A-10G.
Figure 12B:
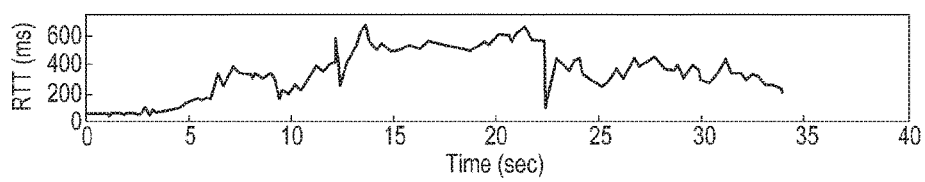
Figure 12C:
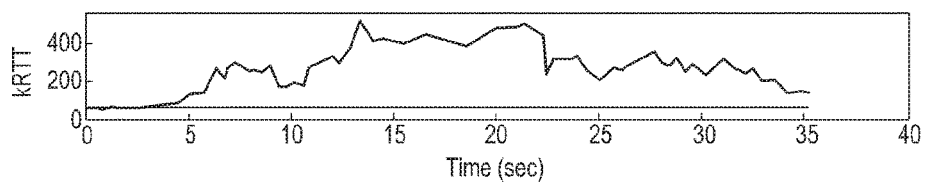
Figure 12D:
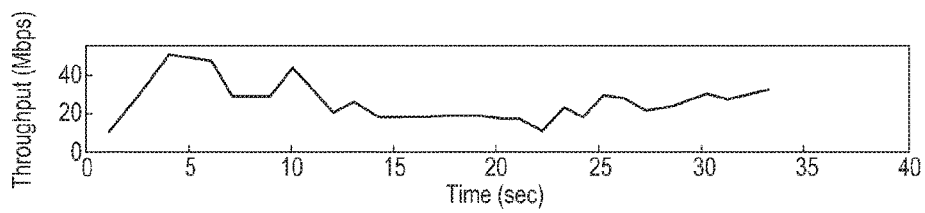
Figure 12E:
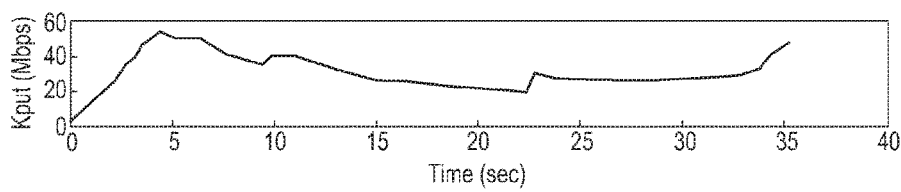
Figure 12F:
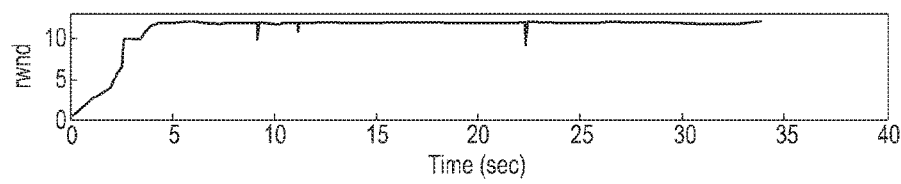
Figure 12G:
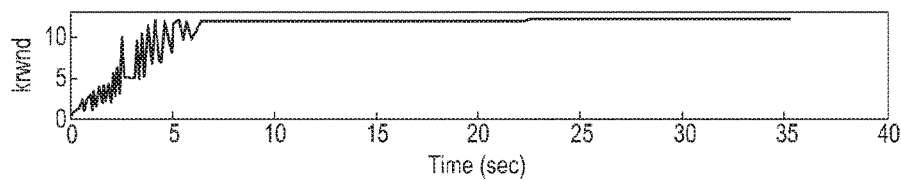

FIG. 7 illustrates a communication system for performing TCP-based transmission control, which may increase a transmission rate and decrease a time delay according to an embodiment of the present disclosure, and FIG. 8 illustrates an exemplary configuration of a user equipment (UE) illustrated in FIG. 7.

Referring to FIG. 7, a server 700 and a UE 800 perform transmission control according to a TCP algorithm proposed in an embodiment of the present disclosure. The server 700 and the UE 800 transmit and receive packets through an Internet protocol (IP)-based network and a mobile communication network 73, and TCP transmission control is performed during the packet transmission and reception. An algorithm operating at a transmission end may be applicable to both the server 700 and the UE 800. In general, changing a TCP algorithm of a server requires a complex process, and thus the TCP algorithm of the present disclosure may be applied to a TCP transmission end of the UE 800. A TCP algorithm operating at a reception end may function to guide a TCP reception end of the UE 800 to operate the TCP algorithm of the present disclosure through RWND, when the server 700 uses a conventional TCP algorithm. Therefore, the TCP algorithm of the present disclosure may be applied to the TCP reception end of the UE 800. In conclusion, if the TCP transmission end and the TCP reception end of the UE 800 are fabricated in an over the air (OTA) update package and provided to the UE 800, the UE 800 may perform the TCP algorithm proposed in the embodiment of the present disclosure, no matter what server 700 the UE 800 transmits and receives data to and from on a downlink and an uplink.

FIG. 8 illustrates the configuration of the UE 800 in the communication system that performs TCP-based transmission control according to the embodiment of the present disclosure. For the convenience of description, both the TCP reception end and the TCP transmission end of the UE 800 are shown together in FIG. 8.

Referring to FIG. 8, the TCP reception end of the UE 800 may be configured to include a controller 850 which has an RTT measurer 851a, an RTT factor calculator 853a, a throughput (Tput) measurer 851b, a Tput factor calculator 853b, a maximum congestion window (CWND_max) & maximum Tput and minimum RTT (MTmR) estimator (hereinbelow, CWND_max & MTmR estimator) 855, and an RWND controller, and a transmitter 830. The transmitter 830 may piggyback a Window field of an ACK with an RWND received from the controller 850 and transmit the ACK.

Referring to FIG. 8 again, the TCP transmission end of the UE 800 may be configured to include a controller 850 which has the RTT measurer 851a, the RTT factor calculator 853a, the Tput measurer 851b, the Tput factor calculator 853b, the CWND_max & MTmR estimator 855, and a CWND controller, a receiver 810, and the transmitter 830. The receiver 810 receives an ACK indicating packet reception from the server 700, and the transmitter 830 controls the amount of packet data to be transmitted to the server 700 based on a CWND received from the controller 850.

For the convenience, the RWND controller and the CWND controller are collectively shown as an RWND & CWND controller 857 in FIG. 8. The configuration of the UE 800 illustrated in FIG. 8 is an exemplary configuration of related function blocks, and those skilled in the art will configure the UE 800 with various types of functional blocks that perform the TCP algorithm according to the embodiment of the present disclosure. In FIG, 8, the transmitter 830 and the receiver 810 include communication interfaces through which the transmitter 830 and the receiver 810 transmit and receive packets to and from the server 700 through the mobile communication network 73.

In FIG. 8, the RWND & CWND controller 857 may perform a known congestion window update algorithm that increases and decreases a congestion window (CWND), similarly to conventional TCP algorithms. According to an embodiment of the present disclosure, the CWND_max & MTmR estimator 855 is added in the TCP algorithm of the present disclosure, in order to estimate a CWND_max value which may lead to a maximum transmission rate and a minimum RTT, and estimate a maximum transmission rate and a minimum RTT (MTmR) which is achievable in a current channel state through the estimated CWND_max value. That is, the CWND_max & MTmR estimator 855 estimates a CWND_max value required to achieve a maximum transmission rate and a minimum RTT by increasing a congestion window, and additionally estimates a maximum transmission rate and a minimum RTT achievable in a given channel environment by combining the estimated CWND_max value and a measured RTT. In this manner, the TCP algorithm of the present disclosure may update the CWND so that the maximum transmission rate and the minimum RTT may be achieved.

To help understanding, the TCP algorithm of the present disclosure will be compared with a conventional loss-based or delay-based TCP algorithm. The conventional loss-based TCP algorithm decreases a congestion window until loss occurs, decreases the congestion window by a predetermined ratio (%) upon occurrence of loss, and then increases the congestion window. The conventional delay-based TCP algorithm increases a congestion window, and if a current RTT is increased relative to a minimum RTT, decreases the congestion window proportionally. That is, the conventional TCP algorithms estimate loss occurrence or delay increase as a time of a maximum transmission rate, and the delay-based TCP algorithm additionally estimates a minimum RTT based on a measurement. If the conventional TCP algorithms perform transmission control in a situation where a maximum transmission rate and a minimum RTT are not achieved, upon occurrence of loss due to congestion as described above, inaccurate estimation of a minimum RTT caused by introduction of other TCP flows and a channel environment change leads to an abnormal operation of the TCP algorithms.

In contrast, according to the TCP algorithm of the present disclosure, update is performed each RTT in both a TCP transmission end and a TCP reception end, and CWND_max (or RWND_Max) may be estimated by [Equation 4], using the product of a minimum RTT measurement and a transmission rate estimate at a time of determining a maximum value for the transmission rate measurement to be converged without further increasing.

$$\text{CWND\_max}=C*\max\_Tput(i)*\min\_RTT(i)(=\text{RWND\_max, in reception end}) \qquad \text{Equation 4}$$

In [Equation 4], C is a random constant with which to set a CWND aggressively in order to correct an error that may be generated in estimation of a minimum RTT observed by the UE 800 until an $i^{th}$ RTT time slot (i.e., min_RTT(i)=min (min_RTT(i−1), RTT(i)) and estimation of a maximum transmission rate observed by the UE 800 until an $i^{th}$ RTT time slot (i.e., max_Tput(i)=max(max_Tput(i−1), Tput(i)), and achieve a maximum transmission rate. C may be set to a value selected between about 1 and 1.5. In the embodiment, C is assumed to be 1.2.

In the embodiment of the present disclosure, max_Tput(i) and min_RTT(i) may be updated every RTT by [Equation 5], and an update period may be changed to a value larger than the RTT according to a network state.

$$\max\_Tput(i)=\max(\max\_Tput(i-1),\text{current}\_Tput)$$

$$\min\_RTT(i)=\min(\min\_RTT(i-1),\text{current}\_RTT) \qquad \text{Equation 5}$$

To determine that a transmission rate measurement has reached a maximum value, the UE 800 may use max_Tput (i−1) which has been kept for a predetermined multiple of an RTT (for example, 3*RTT) without being updated by the current transmission rate (current_Tput), or which has been updated by current_Tput to fast determine a time of reaching a maximum value but has been kept with a predetermined ratio of update (for example, for 3*RTT below 3% of update). 3*RTT and 3% are arbitrary criteria presented for the convenience of description. For more accurate determination, a longer time may be awaited, or for faster determination, the update range may be extended to 5% or the like or may be changed.

If CWND_max or RWND_max is set according to the above operation (that is, max_Tput_found=1 indicating that a maximum transmission rate has been found), the UE 800 may estimate a maximum transmission rate and a minimum RTT every RTT by [Equation 6], and update CWND(i) or RWND(i) in an $i^{th}$ RTT time slot by [Equation 7], using the estimation result as a target (or threshold) value of TCP control. It is also possible to achieve a maximum transmission rate in a given channel environment by increasing the target maximum transmission rate by a ratio predetermined with respect to a maximum available transmission rate.

$$Tput\_target=CWND\_max*1440*8/RTT(\text{Mbps}, \\ 1440*8 \text{ bits is the size of each packet})$$

$$RTT\_target=\min\_RTT(\text{assuming that min\_RTT is} \\ \text{maintained despite change of channel environment caused by movement}) \qquad \text{Equation 6}$$

(TCP transmission end)CWND($i$)=CWND($i$-1)*RT-
T_factor($i$)+Tput_factor($i$)

CWND($i$)=CWND($i$-1)(if RTT($i$)≥1.5*min_RTT)

(TCP reception end)RWND($i$)=RWND($i$-1)*RT-
T_factor($i$)+Tput_factor($i$)   Equation 7

In [Equation 7], RTT_factor(i) and Tput_factor(i) respectively represent a CWND control amount (value) (or an RWND control amount (value)) to decrease an increased RTT with respect to RTT_target and a CWND control amount (value) (or an RWND control amount (value)) to increase a decreased T_put with respect to Tput_target, in an $i^{th}$ RTT time slot, and are calculated by [Equation 8] in the RTT factor calculator 853$a$ and the Tput factor calculator 853$b$. RTT_factor(i) has a negative value, and Tput_factor(i) has a positive value.

RTT_factor($i$)=G1*(RTT_target−current_RTT)/current_RTT

Tput_factor($i$)=G2*(Tput_target−current_Tput)/ Tput_target   Equation 8

In [Equation 8], G1 and G2 are control constants of a congestion window, which are set to 50 or a value near to 50, representing control gains (maximum control ranges) incurred by RTT and Tput.

The TCP algorithm of the present disclosure is balanced at CWND(i)=CWND(i−1)+0+0. Herein, if both RTT_factor and Tput_factor are 0, this means that RTT_target and Tput_target have been achieved simultaneously, which may be regarded as an ideal situation.

The controller 850 controls an operation of increasing decreasing an RWND or a CWND to achieve the maximum transmission rate and the minimum RTT, even in a situation where a channel is changing, by the TCP algorithm of the present disclosure.

In [Equation 7] and [Equation 8], CWND(i) and RWND (i) may be increased or decreased adaptively so that the maximum transmission rate and the minimum RTT may be satisfied. In the embodiment of the present disclosure, the TCP-based transmission control using [Equation 7] and [Equation 8] may be performed in the form of additive increase additive decrease (AIAD), additive increase multiplicative decrease (AIMD), multiplicative increase multiplicative decrease (MIMD), or multiplicative increase adaptive decrease (MIAD) by calculating RTT_factor and Tput_factor.

For example, in AIAD transmission control, a CWND may be controlled like CWND(i)=CWND(i−1)+ G*RTT_factor(i)+G*Tput_factor(i) (G is a constant).

Further, in AIMD transmission control, a CWND may be controlled like CWND(i)=α*CWND(i−1)*RTT_factor(i)+ (i−α)*CWND(i−1)+G*Tput gain(i) (0<α<1, G is a constant).

Further, in AIMD transmission control, a CWND may be controlled like CWND(i)=CWND(i−1)*RTT_factor(i)+ G*Tput gain(i) (G is a constant).

Further, in MIMD transmission control, a CWND may be controlled like CWND(i)=α*CWND(i−1)*RTT_factor(i)+ (i−α)*CWND*Tput gain(i) (0<α<1).

Further, in MIAD transmission control, a CWND may be controlled like CWND(i)=α*CWND(i−1)+G*RTT_factor (i)+(i−α)*CWND(i−1)*Tput gain(i) (0<α<1, G is a constant).

Further, in MIAD transmission control, a CWND may be controlled like CWND(i)=G*RTT_factor(i)+CWND*Tput gain(i) (G is a constant).

The above CWND control schemes may also be applied to RWND control.

To measure the effects of the TCP algorithm of the present disclosure in a real communication system, results of measurement using a test bed of, for example, a server (Intel IvyBridge i5 CPU, 128GB SSD, and 8GB RAM) operating in Ubuntu 13.10 (Linux Kernel 3.10) and a UE (Nexus 5, Krait 400, Adreno 330, and 2GB RAM) operating in Android 4.42 (Linux Kernel 3.4.10) will be described. The TCP algorithm of the present disclosure may be performed in the Linux kernel of the UE 800. A TCP-probe module was installed in the server 700 to measure TCP performance, and the Linux kernel of the UE 800 also autonomously measured values. The TCP transmission end and the TCP reception end exist separately in the Linux kernel of the UE 800, and the algorithms of the TCP transmission end and the TCP reception end were implemented respectively. A network environment in which the server 700 and the UE 800 are communicatively connected through the Internet 71 and the mobile communication network 73 was assumed.

In the above measurement environment, a base station (BS) of the mobile communication network 73 maintained a signal strength between about −80 dBm to −90 dBM in a good channel environment, and the signal strength was decreased to about −105 dBm in a bad channel environment. A signal strength of −90 dBM or greater may be enough to achieve a rate close to the maximum rate of the mobile communication network 73 (for example, an LTE system), ad a transmission rate is close to 0 at a signal strength of −115 dBM or smaller. The server 700 and the UE 800 were configured to transmit large files to each other for 25 to 60 seconds by TCP according to a test scenario, and when needed, generated a plurality of flows at the same time.

According to measurements in a test performed in an LTE system operated by an operator of each mobile communication network, when the LTE system was connected to a BS capable of supporting a wide band, a maximum transmission rate of 85 Mbps was observed, and when the LTE system was connected to a BS incapable of supporting a wide band, a maximum transmission rate of 50 Mbps was observed. In both cases, the minimum RTTs were respectively observed as about 40 ms and 45 ms.

FIGS. 9A-9G illustrate AWNDs, RTTs, throughputs, and RWNDs measured, by a TCP probe, on an LTE downlink (server: TCP CUBIC and UE: proposed TCP) between a UE fixed at a position and a server, and RTTs, throughputs, and RWNDs (y-axis labels start with k) recorded in the kernel of the UE in a communication system according to an embodiment of the present disclosure.

FISG. 10A-10G illustrate AWNDs, RTTs, throughputs, and RWNDs measured, by a TCP probe, on an LTE downlink (server: TCP CUBIC and UE: proposed TCP) between a UE and a server in a channel environment changed from good to bad and then good, and RTTs, throughputs, and RWNDs recorded in the kernel of the UE in a communication system according to an embodiment of the present disclosure.

FIGS. 9A-9G and 10A-10G illustrate measurement results in the case where a UE is stationary on an LTE downlink (FIGS. 9A-9G) and the UE is moving on the LTE downlink (FIGS. 10A-10G). On the downlink, the server acts as a TCP transmission end, and transmission control is performed so that the server may output a value guided through an RWND by a TCP reception end of the UE as a final AWND. Since the RWND guide value is generally larger than a CWND until a maximum transmission rate is measured, the transmission control takes the form of control of TCP CUBIC being a TCP algorithm of the server. More specifically, it is noted from the observed operations of FIGS. 9A-9G that the TCP algorithm of the present disclosure was converged so that a maximum transmission rate and a minimum RTT were achieved at an AWND of about 320. Herein, the RTT measured by the kernel of the UE was 50 ms on the average FIG. 9C), and the transmission rate measured by the kernel of the UE was 47 ms/Mbps on the average FIG. 9E).

The test results of FIGS. 10A-10G will be described in detail. Even in a scenario in which the UE moves to a bad channel about 10 seconds after measurement starts on a good channel, and returns to the good channel after about 25 seconds, the average RTT was 65 ms and the average transmission rate was 33 Mbps. It is noted that considering that a minimum RTT and a maximum transmission rate measured on the bad channel were 55 ms and 30 Mbps, respectively, performance equivalent to a minimum RTT and a maximum transmission rate achievable in a varying channel environment was always achieved even during movement of the UE.

Meanwhile, FIGS. 11A-11G and FIGS. 12A-12G illustrate TCP performance, when the conventional TCP algorithms (for example, TCP CUBIC and RWND cropping) are applied simultaneously to the same situation as the tests of FIGS. 9A-9G and 10A-10G, respectively. In FIGS. 11A-11G and 12A-12G, average RTTs are 220 ms and 380 ms, respectively. This comparison between test results reveals that the TCP algorithm of the present disclosure has an RTT reduction effect of about 80% without transmission rate loss, compared to the conventional TCP algorithms.

Accordingly, if the TCP algorithm of the present disclosure is applied, a maximum transmission rate and a minimum delay may be achieved at the same time in a mobile state as well as a stationary state of a UE. The test results of the present applicant reveal that the maximum transmission rate is 95% or higher of an available bandwidth and the minimum delay is within 1.5 times of an achievable minimum delay. In addition, application of the TCP algorithm according to the embodiment of the present disclosure may ensure a maximum transmission rate and a minimum delay adaptively according to a network situation irrespective of a channel change caused by movement of a UE.

The invention claimed is:

1. A method for performing transmission control protocol (TCP)-based transmission control in a communication system, the method comprising:
   determining a target maximum transmission rate for TCP control, using a maximum congestion window (CWND) estimated at each interval of round trip time (RTT) time slots;
   determining a target minimum RTT for the TCP control, using a minimum RTT estimated at each interval of the RTT time slots;
   determining an RTT factor using the target minimum RTT and an $i^{th}$ RTT in an $i^{th}$ RTT time slot, and determining a throughput factor using the target maximum transmission rate and an $i^{th}$ transmission rate in the $i^{th}$ RTT time slot and
   updating at least one of a first CWND or a first reception window (RWND) in the $i^{th}$ RTT time slot by applying the RTT factor and the throughput factor to either a second CWND or a second RWND in an $(i-1)^{th}$ RTT time slot.

2. The method of claim 1, wherein the updating comprises updating a maximum transmission rate observed until the $i^{th}$ RTT time slot and a minimum RTT observed until the $i^{th}$ RTT time slot.

3. The method of claim 1, further comprising estimating respective RTTs at each interval of the RTT time slots.

4. The method of claim 1, wherein the throughput factor is used for increasing the $i^{th}$ transmission rate decreased with respect to the target maximum transmission rate.

5. The method of claim 1, wherein the RTT factor is used for decreasing the $i^{th}$ RTT increased with respect to the target minimum RTT.

6. The method of claim 1, wherein the target maximum transmission rate is further set to a value increased by a predetermined ratio with respect to a maximum available transmission rate.

7. The method of claim 1, wherein the updating is performed by a following equation, (TCP transmission end) $CWND(i)=CWND(i-1)*RTT\_factor(i)+Tput\_factor(i)$ $CWND(i)=CWND(i-1)$ (if $RTT(i)≥1.5*min\_RTT$)

(TCP reception end) $RWND(i)=RWND(i-1)*RTT\_factor(i)+Tput\_factor(i)$ where CWND(i) is the first CWND updated in the $i^{th}$ RTT time slot, RWND(i) is the first RWND updated in the $i^{th}$ RTT time slot, RTT_factor(i) is the RTT factor in the $i^{th}$ RTT time slot, Tput_factor(i) is the throughput factor in the $i^{th}$ RTT time slot, min_RTT(i) means min(min_RTT(i-1), current_RTT), min_RTT(i-1) is the target minimum RTT in an $(i-1)^{th}$ RTT time slot, and current_RTT is the $i^{th}$ RTT.

8. The method of claim 7, wherein RTT_factor(i) and Tput_factor(i) are calculated by a following equation, $RTT\_factor(i)=G1*(RTT\_target-current\_RTT)/current\_RTT$ $Tput\_factor(i)=G2*(Tput\_target-current\_Tput)/Tput\_target$ where RTT_target is the target minimum RTT, Tput_target is the target maximum transmission rate, current_RTT is the $i^{th}$ RTT, current_Tput is the $i^{th}$ transmission rate, and G1 and G2 are constants.

9. The method of claim 8,
   wherein RTT_factor(i) has a negative value, and
   wherein Tput_factor(i) has a positive value.

10. The method of claim 1, wherein the first CWND is updated by at least one of following equations;

$CWND(i)=CWND(i-1)+G*RTT\_factor(i)+G*Tput\_factor(i)$ in additive increase additive decrease (AIAD) transmission control;

$CWND(i)=\alpha*CWND(i-1)*RTT\_factor(i)+(i-\alpha)*CWND(i-1)+G*Tput\ gain(i)$ in the AIAD transmission control;

$CWND(i)=CWND(i-1)*RTT\_factor(i)+G*Tput\ gain(i)$ in the AIAD transmission control;

$CWND(i)=\alpha*CWND(i-1)*RTT\_factor(i)+(i-\alpha)*CWND*Tput\ gain(i)$ in multiplicative increase multiplicative decrease (MIMD) transmission control;

$CWND(i)=\alpha*CWND(i-1)+G*RTT\_factor(i)+(i-\alpha)*CWND(i-1)*Tput\ gain(i)$ in MIMD transmission control; or $CWND(i)=G*RTT\_factor(i)+CWND*Tput\_gain(i)$ in MIMD transmission control, where $0<\alpha<1$, G is a constant, CWND(i) is the first CWND updated in the $i^{th}$ RTT time slot, RTT_factor(i) is the RTT factor in the $i^{th}$ RTT time slot, Tput gain(i) is a throughput gain in the $i^{th}$ RTT time slot and Tput_factor(i) is the throughput factor in the $i^{th}$ RTT time slot.

11. The method of claim 1, wherein the determining of the RTT factor comprises determining a first difference between the target minimum RTT and the $i^{th}$ RTT, and determining the RTT factor using the first difference, and
wherein the determining of the throughput factor comprises determining a second difference between the target maximum transmission rate and the $i^{th}$ transmission rate, and determining the throughput factor using the second difference.

12. An apparatus for performing transmission control protocol (TCP)-based transmission control in a communication system, the apparatus comprising:
a transceiver configured to transmit and receive data through a network; and
at least one processor configured to control the transceiver and configured to:
determine a target maximum transmission rate for TCP control, using a maximum congestion window (CWND) estimated at each interval of round trip time (RTT) time slots,
determine a target minimum RTT for the TCP control, using a minimum RTT estimated at each interval of the RTT time slots,
determine an RTT factor using the target minimum RTT and an $i^{th}$ RTT in an $i^{th}$ RTT time slot, and determine a throughput factor using the target maximum transmission rate and an $i^{th}$ transmission rate in the $i^{th}$ RTT time slot, and
update at least one of a first CWND or a first reception window (RWND) in the $i^{th}$ RTT time slot by applying the RTT factor and the throughput factor to either a second CWND or a second RWND in an $(i-1)^{th}$ RTT time slot.

13. The apparatus of claim 12, wherein the at least one processor is configured to update a maximum transmission rate observed until the $i^{th}$ RTT time slot and a minimum RTT observed until the $i^{th}$ RTT time slot.

14. The apparatus of claim 12, wherein the at least one processor is further configured to estimate respective RTTs at each interval of the RTT time slots.

15. The apparatus of claim 12, wherein the throughput factor is used for increasing the $i^{th}$ transmission rate decreased with respect to the target maximum transmission rate.

16. The apparatus of claim 12, wherein the RTT factor is used for decreasing the $i^{th}$ RTT increased with respect to the target minimum RTT.

17. The apparatus of claim 12, wherein the target maximum transmission rate is further set to a value increased by a predetermined ratio with respect to a maximum available transmission rate.

18. The apparatus of claim 12, wherein the at least one processor is configured to update using following equation, (TCP transmission end) $CWND(i)=CWND(i-1)*RTT\_factor(i)+Tput\_factor(i)$ $CWND(i)=CWND(i-1)$ (if $RTT(i) \geq 1.5*min\_RTT$)

(TCP reception end) $RWND(i)=RWND(i-1)*RTT\_factor(i)+Tput\_factor(i)$ where CWND(i) is the first CWND updated in the $i^{th}$ RTT time slot, RWND(i) is the first RWND updated in the $i^{th}$ RTT time slot, RTT_factor(i) is the RTT factor in the $i^{th}$ RTT time slot, Tput_factor(i) is the throughput factor in the $i^{th}$ RTT time slot, min_RTT(i) means min(min_RTT(i-1), current_RTT), min RTT(i-1) is the target minimum RTT in the $(i-1)^{th}$ RTT time slot, and current_RTT is the $i^{th}$ RTT.

19. The apparatus of claim 12, wherein RTT_factor(i) and Tput_factor(i) are calculated by a following equation, $RTT\_factor(i)=G1*(RTT\_target-current\_RTT)/current\_RTT$ $Tput\_factor(i)=G2*(Tput\_target-current\_Tput)/Tput\_target$ where RTT_target is the target minimum RTT, Tput_target is the target maximum transmission rate, current_RTT is the $i^{th}$ RTT, current Tput_is the $i^{th}$ transmission rate, and G1 and G2 are constants.

20. The apparatus of claim 19,
wherein RTT_factor(i) has a negative value, and
wherein Tput_factor(i) has a positive value.

21. The apparatus of claim 12, wherein the first CWND is updated by at least one of following equations;

$CWND(i)=CWND(i-1)+G*RTT\_factor(i)+G*Tput\_factor(i)$ in additive increase additive decrease (AIAD) transmission control;

$CWND(i)=\alpha*CWND(i-1)*RTT\_factor(i)+(i-\alpha)*CWND(i-1)+G*Tput\_gain(i)$ in the AIAD transmission control;

$CWND(i)=CWND(i-1)*RTT\_factor(i)+G*Tput\_gain(i)$ in the AIAD transmission control;

$CWND(i)=\alpha*CWND(i-1)*RTT\_factor(i)+(i-\alpha)*CWND*Tput\_gain(i)$ in multiplicative increase multiplicative decrease (MIMD) transmission control;

$CWND(i)=\alpha*CWND(i-1)+G*RTT\_factor(i)+(i-\alpha)*CWND(i-1)*Tput\_gain(i)$ in MIMD transmission control; or $CWND(i)=G*RTT\_factor(i)+CWND*Tput\_gain(i)$ in multiplicative increase multiplicative decrease (MIMD) transmission control, where $0<\alpha<1$, G is a constant, CWND(i) is the first CWND updated in the $i^{th}$ RTT time slot, RTT_factor(i) is the RTT factor in the $i^{th}$ RTT time slot, Tput gain(i) is a throughput gain in the $i^{th}$ RTT time slot and Tputfactor(i) is the throughput factor in the $i^{th}$ RTT time slot.

22. The apparatus of claim 12, wherein the at least one processor is further configured to:
determine a first difference between the target minimum RTT and the $i^{th}$ RTT, and determine the RTT factor using the first difference, and
determine a second difference between the target maximum transmission rate and the $i^{th}$ transmission rate, and determine the throughput factor using the second difference.

* * * * *